United States Patent
Duan et al.

(10) Patent No.: US 9,866,136 B2
(45) Date of Patent: Jan. 9, 2018

(54) ISOLATED POWER SUPPLY WITH INPUT VOLTAGE MONITOR

(71) Applicant: Analog Devices Global, Hamilton (BM)

(72) Inventors: Jun Duan, Shanghai (CN); Liuqing Yang, Shanghai (CN); Xudong Huang, Fremont, CA (US); Zhijie Zhu, Shanghai (CN); Renjian Xie, Shenzhen (CN)

(73) Assignee: Analog Devices Global, Hamilton (BM)

(*) Notice: Subject to any disclaimer, the term of this patent is extended or adjusted under 35 U.S.C. 154(b) by 26 days.

(21) Appl. No.: 14/100,463

(22) Filed: Dec. 9, 2013

(65) Prior Publication Data

US 2015/0162837 A1 Jun. 11, 2015

(51) Int. Cl.
*H02M 3/335* (2006.01)
*H02M 3/337* (2006.01)

(52) U.S. Cl.
CPC ....... *H02M 3/337* (2013.01); *H02M 3/33569* (2013.01); *H02M 3/33592* (2013.01); *Y02B 70/1475* (2013.01)

(58) Field of Classification Search
USPC .............. 363/15–17, 21.04–21.06, 21.1, 363/21.12–21.14, 21.18
See application file for complete search history.

(56) References Cited

U.S. PATENT DOCUMENTS

| | | | |
|---|---|---|---|
| 6,813,166 B1* | 11/2004 | Chang et al. | 363/21.14 |
| 8,283,904 B2* | 10/2012 | Myers | 323/267 |
| 2001/0033498 A1* | 10/2001 | Lee | H02M 3/337 363/17 |
| 2005/0197791 A1* | 9/2005 | Matsumoto | H02M 3/33523 702/60 |
| 2009/0212758 A1 | 8/2009 | Asinovski et al. | |
| 2010/0027298 A1* | 2/2010 | Cohen | 363/21.14 |

(Continued)

OTHER PUBLICATIONS

"Isolated power conversion: making the case for secondary-side control", [Online]. Retrieved from the internet: <http://www.edn.com/design/power-management/4344168/Isolated-power-conversion-making-the-case-for-secondary-side-control>., (Accessed Nov. 1, 2013), 5 pgs.

(Continued)

*Primary Examiner* — Jeffrey Gblende
(74) *Attorney, Agent, or Firm* — Schwegman Lundberg & Woessner, P.A.

(57) ABSTRACT

A power converter can include an electrical isolation circuit between input and output nodes. An input signal monitor node can be provided, such as on a converter output side of the isolation circuit. In an example, a peak detection circuit can be coupled to the input signal monitor node. The output node of the power converter can be configured to supply an output power signal that is a function of an input signal at the input node. The power converter can include multiple, independently-switchable switches at one or more of the input and output sides of the isolation circuit. In an example, the power converter with the input signal monitor node can be configured as a bias supply to provide power, at the output node, to a controller circuit for a main stage power converter circuit.

19 Claims, 5 Drawing Sheets

(56) References Cited

U.S. PATENT DOCUMENTS

| | | | |
|---|---|---|---|
| 2010/0067261 A1* | 3/2010 | Nakanishi | H02M 1/36 363/21.02 |
| 2010/0118571 A1* | 5/2010 | Saint-Pierre | 363/89 |
| 2011/0285344 A1* | 11/2011 | Lin et al. | 320/107 |
| 2013/0148385 A1* | 6/2013 | Zhang | 363/21.12 |
| 2013/0155726 A1* | 6/2013 | Xu | H02M 3/33576 363/17 |
| 2014/0313784 A1* | 10/2014 | Strzalkowski | 363/17 |

OTHER PUBLICATIONS

"Secondary-Side Controller with Current Share and Housekeeping", Analog Devices, [Online]. Retrieved from internet <http://www.analog.com/static/imported-files/data_sheets/ADM1041A.pdf>, (Accessed Nov. 1, 2013), 56 pgs.

"Synchronous Rectification", Chapter Two, [Online]. Retrieved from the internet: <http://scholar.lib.vt.edu/theses/available/etd-173510281975580/unrestricted/chapter2.pdf>, (Accessed Nov. 1, 2013), 64 pgs.

* cited by examiner

ISOLATED POWER SUPPLY WITH INPUT VOLTAGE MONITOR

TECHNICAL FIELD

This document pertains generally, but not by way of limitation, to switched power supply circuits.

BACKGROUND

Power systems can include one or more voltage or current converter circuits. The converter circuits can receive an electrical input signal having an input signal magnitude, frequency, and/or phase at an input side, and provide an electrical output signal at an output side, such as having a similar or different signal magnitude, frequency, and/or phase. Some power systems include one or more switches configured to adjust the output signal magnitude, frequency, and/or phase based on the input signal. Some power systems can include an isolation circuit, such as including a transformer, to electrically isolate a converter output stage from a converter input stage using corresponding primary and secondary sides of the transformer.

OVERVIEW

An output stage of an isolating power converter can include a rectifier circuit. The rectifier circuit can include one or more diodes to regulate an output signal from the power system. The rectifier circuit can include a synchronous rectifier that can include semiconductor switches (e.g., a metal oxide field effect transistor or MOSFET) having an on-state resistance that is low, relative to that of a diode, to improve efficiency of the converter circuit. To reduce or minimize on-state resistance, switching of the synchronous rectifier switches on the output side can be timed in a complementary manner to a switching of one or more switches on the input side of the converter.

One or more switches in a power system can be controlled by a pulse width modulated signal provided by a PWM generator circuit. A control loop can be provided to monitor activity at the output side of the system, compare an output signal with a reference value, and responsively generate a PWM signal to regulate the output voltage via switching of the one or more switches. In a primary-side control scheme, the PWM generator circuit can receive analog information from the secondary side via an isolation circuit (e.g., including an optocoupler). There can be several drawbacks to a primary-side control scheme, including a limited bandwidth of the isolation circuit, and a bottleneck effect at the isolation circuit as information about multiple different converter functions is fed back to the PWM generator circuit.

The present inventors have recognized, among other things, that a problem to be solved can include improving performance of a power converter system. The present inventors have recognized a need, in some power converter systems, to use a bias stage converter circuit to provide a power signal, such as a voltage signal, in a controlled and predictable manner, to enable power conversion in a main stage. The present inventors have further recognized a need for a bias stage converter circuit that can provide accurate information about a bias or main stage input signal. The present inventors have further recognized a need for a bias stage converter circuit with an isolation circuit. The bias stage converter circuit can provide a power signal and an input signal monitor, such as at a secondary side of the isolation circuit, and can use relatively few, inexpensive, and compact circuit components.

The present subject matter can help provide a solution to these or other problems, such as using an isolated power converter circuit to provide a power signal to a control signal generator circuit. The control signal generator circuit can be configured to provide at least one modulation signal, such as a pulse width modulated signal, to a switch in a switching power converter in a main stage to update a power output signal of the system.

This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

A power system can include multiple power converter circuit stages. The power system can include a main stage power converter circuit and a bias stage power converter circuit. The bias stage converter circuit can provide a power signal to a controller. The controller can in turn provide a control signal to the main stage converter circuit. The main stage converter circuit can provide an output signal that is a function of an input signal and of the control signal received from the controller. The bias stage converter circuit can include an input signal monitor node that can be configured to provide information about an input signal to the main stage, the bias stage, or to another circuit.

A power converter circuit stage can include an isolation circuit. The isolation circuit can include a transformer circuit, an optocoupler circuit, or other module that can be configured to electrically isolate an input or primary side of a power converter circuit stage from an output or secondary side of the power converter circuit stage. Electrically isolating primary and secondary sides of a power converter circuit can improve safety, enable a voltage level shift, or help to prevent a ground loop.

Main and bias stage converter circuits having respective isolation circuits can receive an input power signal at their respective primary sides. The main and bias stage converter circuits can be configured to receive an input voltage or current signal from a common supply node. The main stage converter circuit can be configured to provide an output signal in response to a control signal. The control signal can be adjustable based on an operating characteristic at the main stage secondary side. For example, the control signal can be adjusted in response to a sensed load change. The control signal can be provided by a controller, such as a control signal generator circuit. The control signal generator circuit can be powered by the bias stage converter circuit. The main stage output signal can be used to provide a power or control signal to one or more other circuits, such as a digital circuit. In an example, the main stage output signal can be used to drive a power supply for, among other things, a network server device, a telecommunication device, or a storage device.

One or more switches on a primary or secondary side of a power converter stage can be switched to adjust a converter output signal magnitude, frequency, phase, offset, or other characteristic. A control signal generator circuit can be configured to generate one or more control signals, such as can be provided to the respective one or more switches. The one or more switches can respectively include one or more transistors, such as a bipolar junction transistor (BJT) or field-effect transistor (FET). The control signal generator circuit can be configured to generate and provide a pulse width modulated (PWM) signal to the one or more transistors. Like or different PWM signals can be provided to different ones of the transistors. Different converter stages can receive one or more control signals from the same or different control signal generator circuits.

Figure 1:
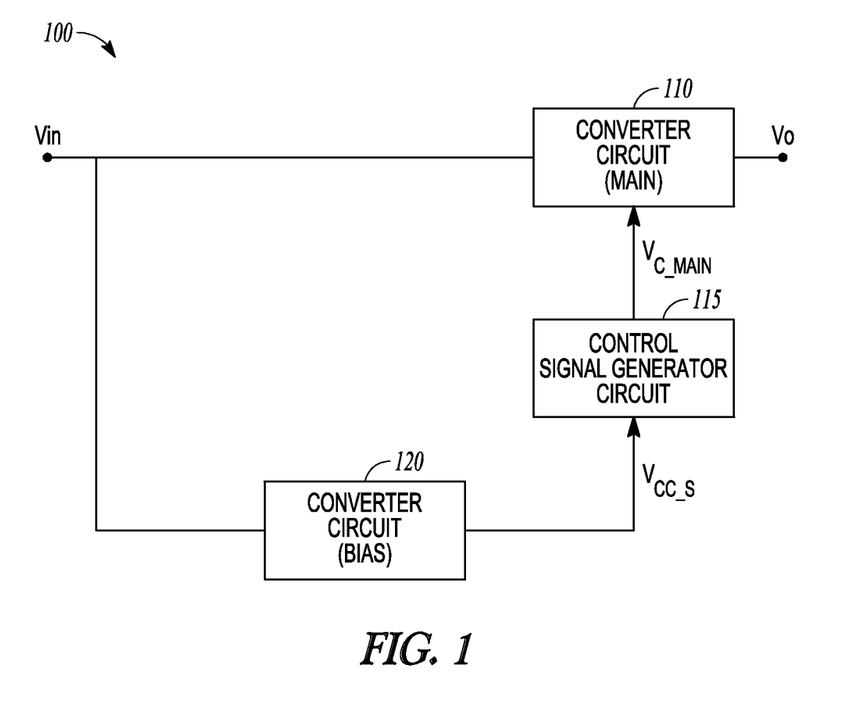
FIG. 1 illustrates generally an example of a power system that can include multiple power converter circuit stages.

FIG. 1 illustrates generally an example of a first power system 100 that can include multiple power converter circuit stages. The first power system 100 can include a main stage power converter circuit 110 and a bias stage power converter circuit 120. The main and bias stage converter circuits 110 and 120 can be coupled to a common supply node 101. The supply node 101 can be configured to receive a voltage supply signal, Vin, such as from a voltage source.

As shown in the example of FIG. 1, one or both of the main and bias stage converter circuits 110 and 120 can respectively include one or more isolating circuits. Each of the converter circuits 110 or 120 can include one or more of a transformer circuit, an optocoupler circuit, or other module that electrically isolates input and output sides of the particular converter circuit. For example, a topology of the main or bias stage converter circuits 110 or 120 can include one or more of a forward converter, a flyback converter, a half-bridge converter, a full-bridge converter, or a resonant converter (e.g., series, parallel, or series-parallel resonant converters), among other topologies. Optionally, at least one of the main or bias stage converter circuits 110 or 120 can include a non-isolated converter, such as a transformerless Ćuk converter.

The first power system 100 can include a first control signal generator circuit 115. The first control signal generator circuit 115 can receive a power signal Vcc_s from the bias stage converter circuit 120. The first control signal generator circuit 115 can be configured to generate a pulse train, such as can include a PWM signal. After powering on, such as using the Vcc_s signal from the bias stage converter circuit 120, the first control signal generator circuit 115 can produce a main stage control signal Vc_main. One or more switches in the main stage converter circuit 110 can receive the Vc_main signal. Using information from the Vc_main signal, the main stage converter circuit 110 can provide a main stage output signal Vo that can be based on, for example, a duty cycle of the Vc_main signal. Although the various input, output, and other signals discussed herein are generally described as voltages, one or more of such signals can be a current signal.

The power system 100 can include main and bias stage converter circuits. The power system 100 can include respective main and bias stage control signal generator circuits. The main stage control signal generator circuit can receive power from the bias stage converter circuit. The main and bias stage control signal generator circuits can respectively generate and provide a control signal, such as to one or more switches in the respective main and bias stage converter circuits. The main and bias stage control signal generator circuits can operate independently, or they can be communicatively coupled to provide coordinated control signals.

Secondary-side control of a main stage converter circuit can use information about an operating characteristic or status of the secondary side of the main stage converter circuit to operate a main stage control signal generator circuit. The main stage control signal generator circuit can be powered by an independent bias stage converter circuit, such as using the power signal Vcc_s generated by the bias stage converter circuit 120, such as in the example of FIG. 1.

The main stage control signal generator circuit (e.g., the first control signal generator circuit 115) can be disposed on or configured to receive information directly from the secondary side of the main stage converter circuit. A feedback loop can be established between a main stage output signal and the main stage control signal generator circuit, such as without requiring an intervening isolation circuit. The resulting feedback loop can be more compact when the main stage control signal generator circuit is configured to receive information from the secondary side of the main stage. In some examples, a protection or cut-off delay can be reduced with respect to topologies where the control signal generator circuit receives an output-modulating signal from the secondary side by way of an isolation circuit. Other advantages of including the main stage control signal generator circuit at the secondary side of the main stage can include, for example, one or more of: (1) faster and more effective identification of overvoltage or overcurrent conditions and responsive limiting; (2) identification of undervoltage or undercurrent conditions and responsive boosting; (3) improved operating supply frequency synchronization with load circuits; (4) load sharing for parallel output applications; or (5) improved overall power system efficiency such as by way of a synchronous rectifier circuit, such as can be controlled by a signal from one of the main or bias stage control signal generator circuits. In the first power system 100 of FIG. 1, for example, the first control signal generator circuit 115 can be configured to provide respective PWM signals (1) to a primary side converter switch and (2) to a secondary side converter switch, such as can be used to provide synchronous rectification.

Optionally, information about a power converter system input signal can be used to update or adjust operation of the converter circuit. Accordingly, an input signal sensing circuit can be provided in a power converter system. One or more power converter circuit stages can include respective input signal sensing circuits. For example, a main stage converter circuit can include a dedicated main stage input signal sensing circuit, or a bias stage converter circuit can include a dedicated bias stage input signal sensing circuit.

Accuracy or predictability of input signal sensing circuit behavior can depend upon a topology of the particular power stage.

Information about an input signal can be used, for example, by a control signal generator circuit, such as to update or adjust a control signal that can be provided to one or more of the power stage converter switches. Information about an input signal status from the input signal sensing circuit can be used, for example, to provide feed-forward control, to monitor an input signal power level, or to implement an under-voltage lockout (UVLO) function. Information about an input signal can include information about a presence or absence of a signal, magnitude, phase, or frequency information, or signal type information, among other characteristics.

In a power system that includes an input signal sensing circuit, a main stage converter circuit can have a forward converter topology, and a corresponding input signal sensing circuit can include a sense node on the secondary side of the forward converter. The forward converter can include a transformer, such as can have a turns ratio of n. The secondary side of the transformer can be coupled (for example at a tap of the transformer) to an output node, such as using an inductor. Information about the input voltage can be sensed at a node between the transformer tap and the inductor. The sensed input voltage Vs can be a function of the input voltage Vin and the turns ratio n, that is, Vs=Vin/n. Until Vin attains a steady state, the sensed voltage Vs can be inaccurate or unpredictable, such as can occur when a forward converter topology is used. An UVLO function can be difficult to implement under such conditions. Also, a noise component of the sensed voltage Vs can increase with a corresponding increase in the secondary side load.

In an example, a bias stage converter circuit (see discussion of FIG. 2, below) can include a main stage input signal sensing circuit, such as when the main and bias stage converter circuits share a common input (see, e.g., FIG. 1). Information about an input signal condition can be provided or detected, such as at a node in the bias stage converter circuit, such as on a secondary side of the bias stage converter circuit. The bias stage converter circuit can have a flyback topology. However, such a topology generally cannot provide accurate input voltage information because a voltage at the secondary side of the flyback converter can be a function of an output voltage, an input voltage, and a turns ratio, which can be expressed as Vs=Vin/n+Vo. The sensed input voltage Vs need not necessarily be linear with respect to the input voltage.

The present inventors have recognized, among other things, a need for a bias stage converter circuit that can provide a power signal, such as a voltage signal, in a controllable manner. The present inventors have further recognized a need for a bias stage converter circuit that can provide accurate information about a bias stage input signal. The present inventors have further recognized a need for a bias stage converter circuit with an isolation circuit configured such that the bias stage converter circuit can provide a power signal and an input signal monitor, such as at a secondary winding side of the isolation circuit when a transformer is used, and using relatively few, inexpensive, and compact circuit components.

Figure 2:
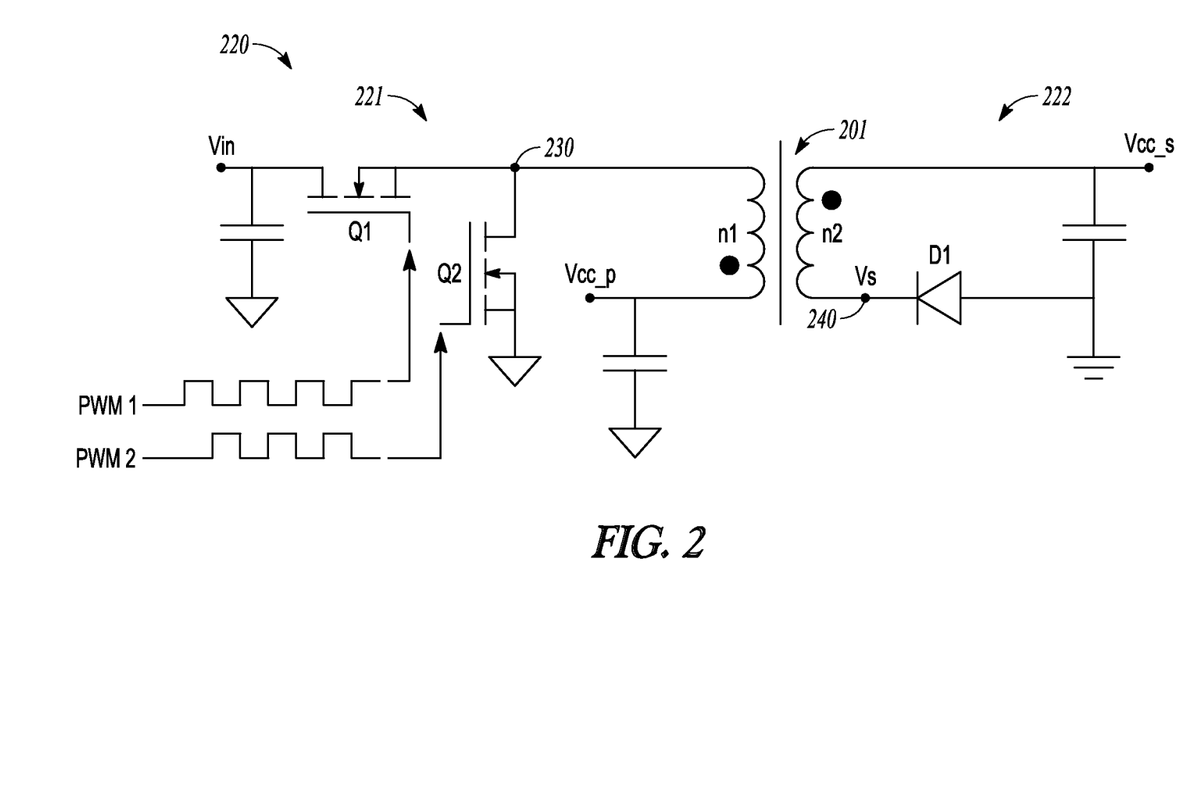
FIG. 2 illustrates generally an example of a bias stage power converter circuit that can include an input signal monitor node.

FIG. 2 illustrates generally an example of a bias stage converter circuit 220. The bias stage converter circuit 220 (converter circuit 220) can include an input node Vin and an output node Vcc_s. The input node Vin can be an input node in common with a main stage converter circuit (see, e.g., FIG. 1). The output node Vcc_s can be configured to provide a power output signal, such as a voltage output signal. The power output signal can be provided to one or more components, such as can include one or more of a controller circuit, a pulse generator circuit, a processor circuit, or other circuit.

The converter circuit 220 can include an isolating circuit, such as can include primary and secondary side circuits that are electrically isolated from each other. In the example of FIG. 2, the converter circuit 220 can include a transformer 201 as a portion of the isolating circuit. The transformer 201 can electrically isolate, and magnetically couple, a primary side circuit 221 and a secondary side circuit 222. The transformer 201 can include n1 primary side windings and n2 secondary side windings.

The converter circuit 220 can include first and second switches Q1 and Q2, such as on a primary side of the transformer 201. The first and second switches Q1 and Q2 can be transistors, such as FETs. Other types of switches, e.g., that are switchable according to a received control signal, can be used. The first and second switches Q1 and Q2 can be controlled by respective individual or common control signals. In an example, Q2 can be replaced by a diode.

In the example of FIG. 2, the first switch Q1 can be configured to receive a first control signal PWM 1, and the second switch Q2 can be configured to receive a second control signal PWM 2. The first and second control signals PWM 1 and PWM 2 can have complementary cycles, e.g., such that when PWM 1 is high (corresponding to an "on" state of Q1), PWM 2 is low (corresponding to an "off" state of Q2), and vice versa. Control signals other than those illustrated in FIG. 2 can be used. For example, the control signals can have overlapping "off" states, or can have "off" states of different durations.

The primary side circuit 221 can be configured such that a voltage at a primary winding of the transformer 201 is a function of a signal at the input node Vin and of a duty cycle of the first switch Q1 relative to the second switch Q2. For example, the primary side voltage can be determined at least in part by an input voltage signal, and an "on" time (or "off" time) of the first switch Q1 relative to the second switch Q2.

In the example of FIG. 2, the first and second switches Q1 and Q2 can have respective terminals that can be commonly coupled to each other at a common node 230. The node 230 can be coupled to a primary winding tap of the transformer 201. The first switch can electrically and switchably couple the input node Vin to the node 230. The second switch can electrically couple the node 230 to a reference node (e.g., a circuit ground or other primary-side electrical reference). One or more capacitive elements can be provided at the input node, at a primary winding tap of the transformer 201, or at one or more other portions of the primary side circuit 221. Optionally, the primary side circuit 221 can be configured to function similarly to a buck converter. A signal Vcc_p at a tap of the primary winding of the transformer 201 can be a function of the input signal Vin and a duty cycle (D) of the first and second switches, e.g., Vcc_p=D*Vin, where Vcc_p can represent a voltage that can be measured at the tap of the primary winding of the transformer 201 that is opposite the node 230.

The secondary side circuit 222 can be configured to provide an input voltage monitor signal Vs and an output signal Vcc_s. The input voltage monitor signal Vs can provide information about the input signal Vin, such as magnitude, frequency, or phase information, among other types. The output signal Vcc_s can be an output voltage or current signal, such as can be switchably adjusted, e.g., using the first and second switches Q1 and Q2 from the primary side circuit 221. The output signal Vcc_s can be electrically isolated from the input signal Vin, such as by way of the transformer 201.

The secondary side circuit 222 can include a secondary side of the transformer 201, such as can include n2 windings with first and second taps. A first tap of the secondary winding can be coupled to an output node, and the output node can supply the output signal Vcc_s. A second, different tap of the secondary winding can be coupled to an input voltage monitor node 240. Information about the input signal Vin can be received from the input voltage monitor node 240.

The converter circuit 220 can be configured such that the output node can provide an output signal Vcc_s that can be substantially proportional to the input signal Vin at the input node of the primary side. For example, the output signal Vcc_s can be proportional to the input signal Vin such as by a factor that corresponds to the duty cycle of the first and second switches Q1 and Q2 or to the turns ratio of the windings of the transformer 201, among other factors.

The secondary side circuit 222 can include a rectifier and an output capacitor. For example, the secondary side circuit 222 can include a first diode D1 at the second tap of the secondary winding. A cathode of the first diode D1 can be coupled to the second tap, and an anode of the first diode D1 can be coupled to a first terminal of the output capacitor. A second terminal of the output capacitor can be coupled to the first tap of the secondary winding, such as to electrically complete the secondary side circuit 222.

In the example of the converter circuit 220 of FIG. 2, the output signal Vcc_s can be a function of the primary winding voltage, a turns ratio of the transformer 201, and a forward voltage of the first diode D1. This can be represented as Vcc_s=(n2/n1)*Vcc_p−$V_{F\_D1}$, in which $V_{F\_D1}$ represents the forward voltage of the first diode D1. The output signal Vcc_s can be used to power one or more other circuits, such as a control circuit that can be configured to provide a PWM signal to a main stage power converter circuit.

During a first portion of a switching cycle, the first switch Q1 can be in an "on" state and the second switch Q2 can be in an "off" state. In this configuration, the input signal Vin can be conducted from the input node through the first switch Q1 to the primary winding of the transformer 201. A magnetic field can be induced as current associated with the input signal flows through the primary winding of the transformer 201. During the first portion of the switching cycle, such as in response to the field induced at the primary winding, a current can be induced in the secondary winding of the transformer 201 in the secondary side circuit 222. However, current flow through the secondary side circuit 222 can be impeded because the first diode D1 can be reverse-biased under some conditions.

The voltage at the input voltage monitor node 240 can be a function of a difference between the input and primary winding voltages, the turns ratio of the transformer 201, and the output signal. This can be represented as Vs=(Vin−Vcc_p)*(n2/n1)+Vcc_s. Substituting the above expression for the output signal Vcc_s and selecting a transformer having a turns ratio of 1, the input voltage monitor signal Vs representation can be reduced to Vs=Vin−$V_{F\_D1}$. On the secondary side of the converter circuit 220, information about the input signal Vin can be sensed at the voltage monitor node 240. The sensed information can include a voltage signal that is substantially proportional to the input signal Vin, such as offset by a diode voltage drop.

During a second portion of the switching cycle, the first switch Q1 can be in an "off" state and the second switch Q2 can be in an "on" state. In this configuration, the input signal Vin can be shunted to a reference node, such as using an input capacitor, and the input signal Vin need not reach the primary winding of the transformer 201. Instead, the first diode D1 can become forward biased, which can permit stored energy in the secondary winding of the transformer 201 to discharge as a current through the first diode D1 and the output capacitor. A responsive current signal can flow from the primary winding through the second switch Q2 to the reference node, such as to discharge the energy stored in the transformer 201.

The bias stage converter circuit 220 can operate in a continuous conduction mode or discontinuous conduction mode. In the continuous conduction mode, the output node Vcc_s can provide a power output signal with a ripple variation, and with a minimum output magnitude that is greater than zero. In the discontinuous conduction mode, the output node Vcc_s can provide a power output signal with a ripple variation, and with a minimum output magnitude of zero. The input voltage monitor node 240 can be configured to provide peak information about the input signal Vin in either of the continuous or discontinuous conduction modes.

The converter circuit 220 can thus provide an input voltage monitor signal Vs that can be based on a voltage at a side of the converter circuit 220 that can be electrically isolated from a side of the converter circuit 220 that receives the input signal Vin. The input voltage monitor signal Vs can be substantially linearly related to an input voltage signal at the primary side of the converter circuit 220.

In the example of FIG. 2, the offset term $V_{F\_D1}$ in the expression Vs=Vin−$V_{F\_D1}$ can be due to a forward voltage of the first diode D1. The first diode D1 can be a Schottky diode, such as to reduce or minimize the forward voltage. A forward voltage for a Schottky diode can be about 0.4 V. Expected operating conditions for the converter circuit can influence selection of the first diode D1. For example, a diode forward voltage response to an expected temperature change can be considered when selecting the first diode D1.

Figure 3:
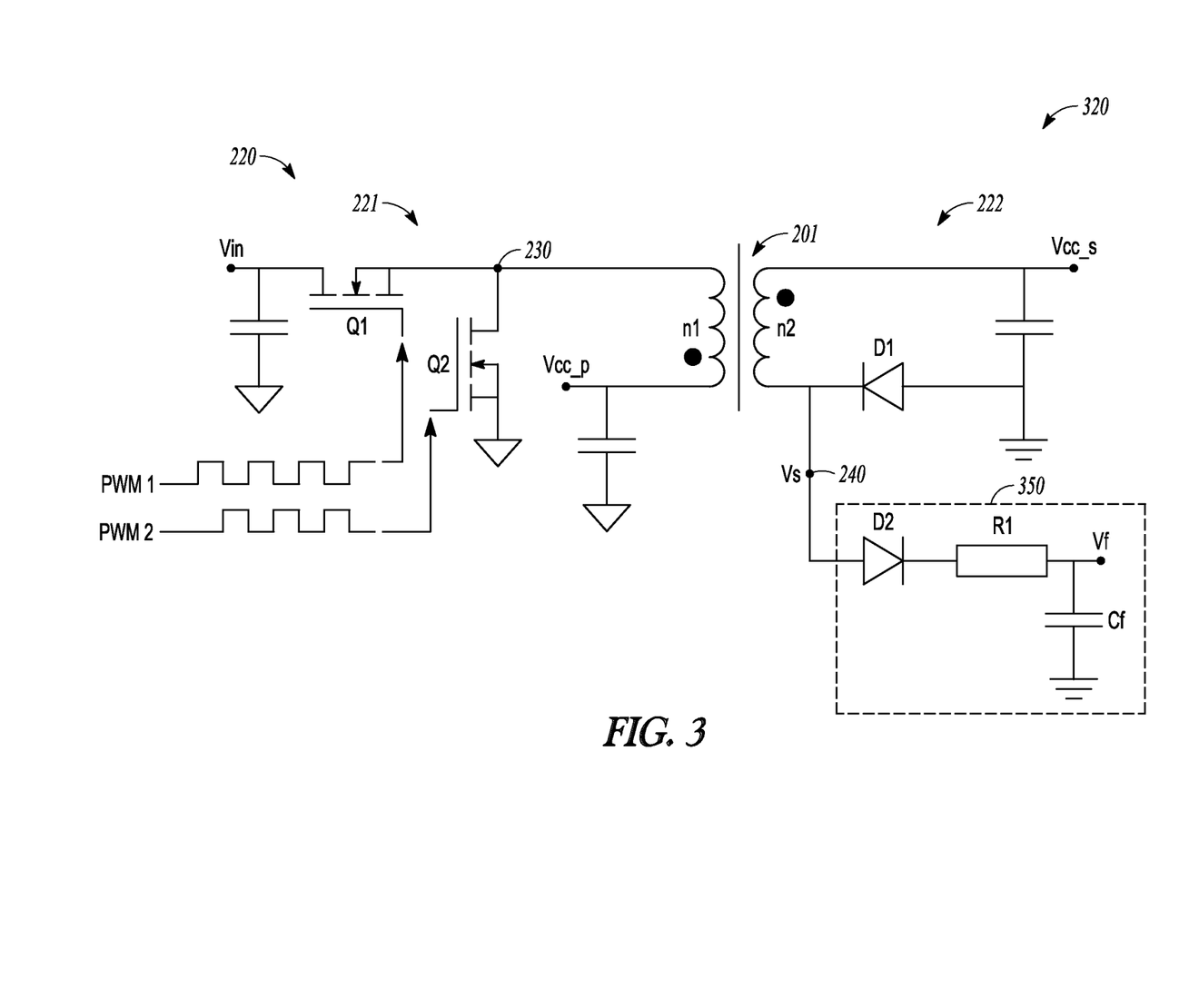
FIG. 3 illustrates generally an example of a bias stage power converter circuit that can include an input signal monitor node and a peak detector circuit.

Peak information about the input signal can be used to update or adjust a function of one or both of the main or bias stage converter circuits. FIG. 3 illustrates generally an example of a converter circuit 320 that can provide peak information about the input signal. The converter circuit 320 can include the bias stage converter circuit 220, such as described above, and a peak or level detector circuit 350. The peak or level detector circuit 350 can be configured to provide information about a characteristic of the input signal Vin at the bias stage converter circuit 220. The peak or level detector circuit 350 can be configured to detect a peak amplitude of a voltage signal, such as can be measured at a secondary winding of an isolation circuit of a power converter circuit.

The peak or level detector circuit 350 can include a gating component and an RC output stage. The gating component can include a second diode D2. The cathode of the second diode D2 can be coupled to the RC output stage. The RC output stage can include a first resistor R1 and an output capacitor Cf. The cathode of the second diode D2 can be coupled to a first terminal of the first resistor R1, a second terminal of the first resistor R1 can be coupled to a terminal of the output capacitor Cf, and a different terminal of the output capacitor Cf can be coupled to a circuit reference node or ground. A sampled input voltage signal Vf, such as can include peak information about an input signal, can be provided across the output capacitor Cf.

The anode of the second diode D2 can be coupled to the input voltage monitor node 240, such as to receive information about the input voltage monitor signal Vs. Current can flow through the second diode D2 in the peak or level detector circuit 350, such as during portions of the switching cycle of the bias stage converter circuit 220 corresponding to Q1 in an "on" state and Q2 in an "off" state. Under these conditions, the first diode D1 can generally be reverse biased, and the second diode D2 can be forward biased. Accordingly, a current can flow through the RC output stage of the peak or level detector circuit 350, and information about a peak of the input voltage monitor signal Vs can be stored using the output capacitor Cf. Because Vs can be substantially proportional to the input signal Vin, such as described above in the discussion of FIG. 2, peak information about the input signal Vin can be detected by the peak or level detector circuit 350 and stored, such as temporarily, using the output capacitor Cf. A difference, such as due to the second diode D2, can exist between an actual peak of the input signal Vin and peak information provided by the sampled input voltage signal Vf. As described above in the example of FIG. 2, various factors can be considered when selecting a diode, such as the first and second diodes D1 and D2. In an example, a Schottky diode can be selected for the second diode D2, such as to reduce or minimize a difference between peak information in an input signal Vin and peak information in the sampled input voltage signal Vf.

Figure 4:
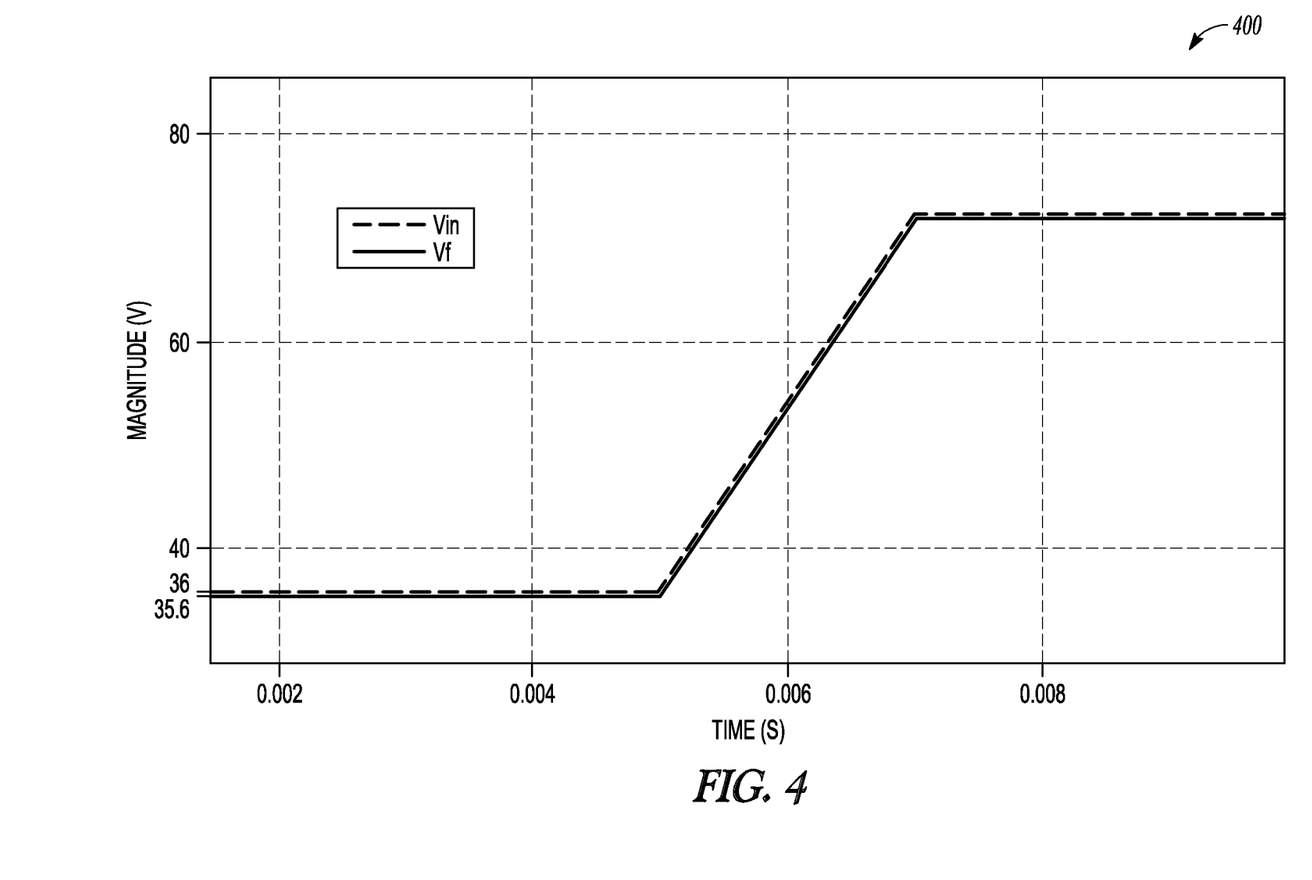
FIG. 4 illustrates generally an example of a chart that can include an input voltage signal and a sampled input voltage signal.

FIG. 4 illustrates generally an example of a chart 400 that shows a computerized circuit simulation result. The chart 400 includes computer-simulated circuit signal magnitude information versus time for various nodes in a circuit, such as based on the topology of the converter circuit 320 of FIG. 3. In particular, the chart 400 includes a simulation result for an input signal Vin and a sampled input voltage signal Vf (see FIG. 3). The chart 400 is not drawn to scale in order to emphasize an offset characteristic of the illustrated signals. In the example of FIG. 4, the chart 400 shows an input (voltage) signal step-up from about 36 V to 72 V over a duration of about 2 ms.

For an initial period, the input signal Vin has a steady state value of about 36 V DC. The sampled input voltage signal Vf similarly provides a steady state value of about 35.6 V, corresponding to the input signal Vin less a diode voltage drop corresponding to the second diode, such as when the transformer 201 includes windings having a like number of turns. For example, the turns ratio can be about 1:1. At about time 5 ms in the chart 400, the input signal Vin is ramped up, reaching 72 V at about time 7 ms. The sampled input voltage signal Vf maintains its proportional relationship to the input voltage Vin throughout the ramp-up period of about 2 ms and after. That is, the sampled input voltage signal Vf magnitude is offset from the input voltage Vin magnitude by about 0.4 V throughout the step-up. The sampled input voltage signal Vf can be used to provide a signal that closely corresponds to the input voltage signal, such as when the converter circuit 320 is configured as shown in the example of FIG. 3.

Figure 5:
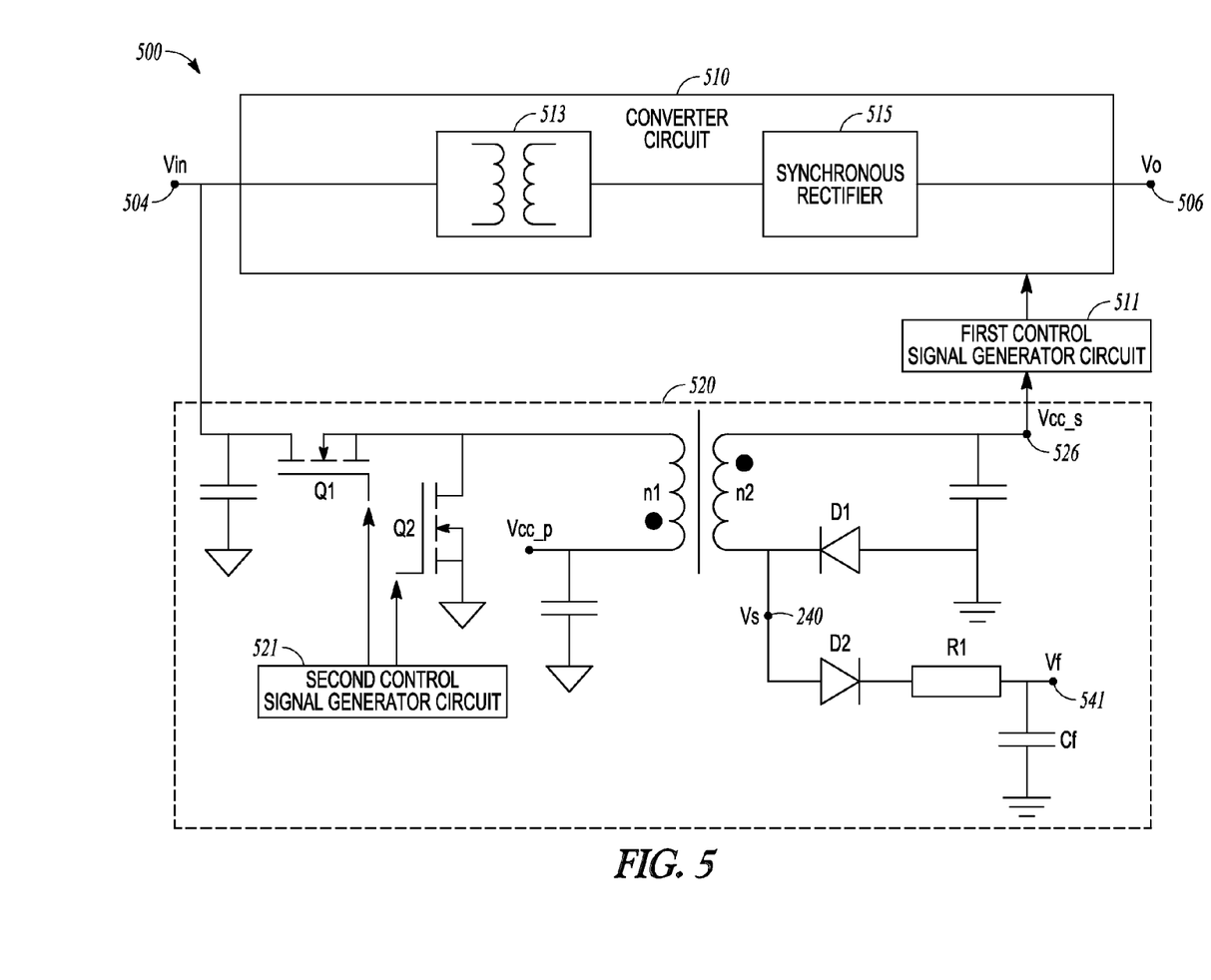
FIG. 5 illustrates generally an example of a power system that can include multiple power converter circuit stages.

Various systems can use a power converter stage that includes an isolation circuit and one or more nodes from which input signal conditions can be monitored, such as at a secondary side of the isolation circuit. FIG. 5 illustrates generally an example of a second power system 500 that can include multiple power converter circuit stages. The second power system 500 can include a first stage power converter circuit 510 and a second stage power converter circuit 520. In an example, the second stage power converter circuit 520 includes the converter circuit 320 from the example of FIG. 3, such as including the bias stage converter circuit 220 and the peak or level detector circuit 350.

In the example of FIG. 5, the first and second stage power converter circuits 510 and 520 can be coupled to a common supply node 504 that can be configured to receive an input signal Vin. The first stage power converter circuit 510 can be configured to provide a system or first stage power output signal Vo at an output node 506. The second stage power converter circuit 520 can be configured to provide a second stage power output signal Vcc_s at a second stage output node 526. The second stage power converter circuit 520 can be configured to provide an input signal monitor, such as at the input voltage monitor node 240, or at a peak sample node 541. A signal received from the peak sample node 541 can correspond to a signal at the node in the RC filter between the resistor R1 and the output capacitor Cf.

In FIG. 5, the first stage power converter circuit 510 can be any type of switched power supply circuit. For example, the first stage power converter circuit 510 can include a forward, flyback, half-bridge, full-bridge, LLC, synchronous, or other topology. In FIG. 5, the first stage power converter circuit 510 can include an isolation circuit 513 and a synchronous rectifier circuit 515.

A first control signal generator circuit 511 can be configured to provide a control signal to one or more switches in the first stage power converter circuit 510. The first control signal generator circuit 511 can be configured to supply a PWM signal to one or more transistors in the first stage power converter circuit 510, such as on a primary side of the isolation circuit 513. The first control signal generator circuit 511 can be configured to supply a different PWM signal to one or more transistors in the synchronous rectifier circuit 515.

The first control signal generator circuit 511 can be configured to receive a power signal from an output of the second stage power converter circuit 520. For example, the first control signal generator circuit 511 can receive the second stage power output signal Vcc_s. The second stage power converter circuit 520 can include an isolation circuit to electrically isolate an output side of the second stage from an input side of the second stage. The input side of the second stage can be configured to receive an input signal Vin at the common supply node 504. The output signal Vcc_s can be a function of the input signal Vin according to a duty cycle of one or more switches on a primary or secondary side of the second stage power converter circuit 520. The second stage power converter circuit 520 can optionally include or can be coupled to a second control signal generator circuit 521. The second control signal generator circuit 521 can provide PWM signals to one or more of the first and second switches Q1 and Q2 such as to switchably control the second stage power output voltage Vcc_s.

Information about the input signal Vin can be provided on a secondary side of the second stage power converter circuit 520. For example, as described above regarding FIG. 2, information about the input signal Vin can be sensed at the voltage monitor node 240. The sensed information can include an input voltage monitor signal Vs that is substantially proportional to the input signal Vin, such as offset by a diode voltage drop. For example, $Vs=Vin-V_{F\_D1}$. The diode can be selected according to an operating characteristic of the power system, and the input voltage monitor signal Vs can be predictably proportion to the input voltage Vin at the system input.

ADDITIONAL NOTES

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. For example, a switching or control signal can be provided to one or more switches in a converter circuit according to instructions on a computer-readable medium, such as can be implemented by a processor circuit. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The claimed invention is:

1. An isolating power converter circuit, comprising:
    a primary side circuit including an input node, first and second switches, and a primary winding of a transformer, wherein the primary side circuit is configured to provide a voltage across the primary winding that is a function of an input signal at the input node and of a duty cycle of a switching period of the first switch relative to the second switch; and
    a secondary side circuit including a first diode and a secondary winding of the transformer having first and different second taps, wherein the first tap is coupled to an output node of the converter circuit and the second tap is coupled to an input voltage monitor node and to a cathode of the first diode, and wherein an anode of the first diode is coupled to a reference node for the secondary side circuit;
    wherein the input voltage monitor node is configured to provide an input voltage monitor signal that is the same polarity as the input signal at the input node and is substantially proportional to the input signal at the input node, and wherein the input voltage monitor node provides the input voltage monitor signal over the switching period for the first and second switches; and
    wherein the output node is configured to provide the output signal to a first controller circuit, and wherein the output signal is substantially proportional to the input signal.

2. The power converter circuit of claim 1, wherein the primary winding of the transformer includes a primary tap that is coupled to respective terminals of the first and second. switches.

3. The power converter circuit of claim 2, wherein the first switch includes a first terminal that is coupled to the input node, and the first switch includes a second terminal that is coupled to the primary tap of the transformer.

4. The power converter circuit of claim 1, wherein the second switch includes a first terminal that is coupled to the primary tap, and the second switch includes a second terminal that is coupled to a reference node for the primary side circuit.

5. The power converter circuit of claim 1, comprising a second controller circuit configured to provide respective control signals to the first and second switches.

6. The power converter circuit of claim 1, comprising a peak detector circuit configured to detect a peak voltage signal across the secondary winding of the transformer.

7. The power converter circuit of claim 1, comprising a second diode, wherein the second tap of the secondary winding of the transformer is coupled to an anode of the second diode.

8. The power converter circuit of claim 7, comprising a peak input voltage monitor node at a cathode of the second diode.

9. The power converter circuit of claim 7, wherein one of the first and second diodes is a Schottky diode.

10. The power converter circuit of claim 1, wherein the primary and secondary windings of the transformer have a like number of turns.

11. The power converter circuit of claim 1, wherein the output node is configured to provide to the first controller circuit a continuous-current signal.

12. An isolating power converter circuit, comprising:
a rectifier circuit;
an input node configured to be coupled to a voltage source;
a transformer having first and second windings, wherein a first tap of the first winding is coupled to the input node using a first switch and to a reference node using a second switch, and wherein a first tap of the second winding is coupled to a voltage output node that provides an output signal that is substantially proportional to an input signal at the input node, and a different second tap of the second winding is coupled to a sense node and the rectifier circuit; and
wherein the different second tap of the second winding is configured to provide, at the sense node and to a pulse generator circuit, an input voltage monitor signal that is the same polarity as the input signal at the input node and is substantially proportional to the input signal at the input node and substantially independent of the output signal at the voltage output node, wherein the input voltage monitor signal is provided over a switching period that includes switching both the first and second switches.

13. The power converter circuit of claim 12, wherein the first and second windings have substantially the same number of turns.

14. The power converter circuit of claim 12, wherein the first and second switches are switchable according to respective duty cycle control signals, and wherein a magnitude of an output voltage power signal available at the voltage output node is a function of an input voltage signal at the input node and of the duty cycle control signals.

15. The power converter circuit of claim 12, wherein the rectifier circuit includes a diode having a cathode terminal that is coupled to the different second tap of the second winding.

16. The power converter circuit of claim 12, further comprising a peak detector circuit coupled to the sense node and configured to sample peak signal information about the input voltage monitor signal.

17. The power converter circuit of claim 12, comprising first and second diodes, wherein the second tap of the secondary winding of the transformer is coupled to a cathode of the first diode, and wherein the second tap is coupled to an anode of the second diode.

18. A power converter system, comprising:
an input voltage node;
a control signal generator circuit;
a first power stage converter, including:
a first transformer including a first transformer primary side configured to receive a voltage signal from the input voltage node, and a first transformer secondary side having a first power stage output node configured to provide an output voltage signal; and.
a first switch that is switchable to update the output voltage signal according to a modulation signal received from the control signal generator circuit; and
a second power stage converter, configured to provide a voltage supply signal to the control signal generator circuit, the second power stage converter including:
a second transformer including a second transformer primary side circuit with a second transformer primary winding and second and third switches, and a second transformer secondary side with a second transformer secondary winding, wherein the second transformer primary side circuit is configured to provide a voltage across the second transformer primary winding that is a function of a signal at the input voltage node and of a duty cycle of a switching period of the second switch relative to the third switch; and
wherein the second transformer secondary winding includes first and second taps respectively coupled to an input voltage monitor node and a second power stage output node, wherein the second power stage output node is configured to provide the voltage supply signal to the control signal generator circuit, wherein the voltage supply signal is substantially proportional to the voltage signal at the input voltage node, and wherein the input voltage monitor node is configured to provide an input voltage monitor signal that is substantially proportional to the voltage signal at the input voltage node and wherein the input voltage monitor node provides the input voltage monitor signal over the switching period.

19. The power converter system of claim 18, wherein the second switch includes a first terminal that is coupled to the input voltage node, wherein the second and third switches include respective second and third terminals that are coupled to the second transformer primary winding, and wherein the third switch includes a fourth teiminal that is coupled to a reference node.

* * * * *